(12) United States Patent
Wakabayashi

(10) Patent No.: US 10,817,612 B2
(45) Date of Patent: Oct. 27, 2020

(54) INFORMATION PROCESSING DEVICE, INFORMATION PROCESSING METHOD, AND ELECTRONIC APPARATUS

(71) Applicant: SONY CORPORATION, Tokyo (JP)

(72) Inventor: Masaki Wakabayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 282 days.

(21) Appl. No.: 15/309,305

(22) PCT Filed: Apr. 30, 2015

(86) PCT No.: PCT/JP2015/062936
§ 371 (c)(1),
(2) Date: Nov. 7, 2016

(87) PCT Pub. No.: WO2015/174285
PCT Pub. Date: Nov. 19, 2015

(65) Prior Publication Data
US 2017/0154186 A1    Jun. 1, 2017

(30) Foreign Application Priority Data
May 16, 2014  (JP) .................................. 2014-102329

(51) Int. Cl.
*G06F 21/62* (2013.01)
*G06F 21/57* (2013.01)
*G06F 9/4401* (2018.01)

(52) U.S. Cl.
CPC ............ *G06F 21/62* (2013.01); *G06F 9/4401* (2013.01); *G06F 9/4406* (2013.01); *G06F 21/575* (2013.01); *G06F 2221/2135* (2013.01)

(58) Field of Classification Search
CPC ...... G06F 21/62; G06F 9/4406; G06F 9/4401; G06F 21/575; G06F 2221/2135
See application file for complete search history.

(56) References Cited

U.S. PATENT DOCUMENTS 5,274,829 A * 12/1993 Hotta ...................... G06F 9/26
                                                    712/205
5,608,876 A *  3/1997 Cohen ................ G06F 12/0684
                                                    710/10

(Continued)

FOREIGN PATENT DOCUMENTS

JP     05-250267 A      9/1993
JP     05-266681 A     10/1993

(Continued)

OTHER PUBLICATIONS

Fiorin—"Secure Memory Accesses on Networks-on-Chip," IEEE Transactions on Computers, vol. 57, No. 9, Sep. 2008, pp. 1216-1229 (Year: 2008).*

(Continued)

*Primary Examiner* — Luu T Pham
*Assistant Examiner* — James J Wilcox
(74) *Attorney, Agent, or Firm* — Chip Law Group

(57) ABSTRACT

An information processing device of the present disclosure includes: a first storage section for reading only that stores first data beforehand, and restricts reading of the first data after a first event; an operation section that performs one or both of encoding and decoding with use of key data, and restricts, after a second event, change of the key data to be used; a second storage section being readable and writeable and including a plurality of storage regions for each of which access conditions are set, the second storage section that restricts change of the access conditions after a third event; and an information processor that controls the first storage (Continued)

section, the operation section, and the second storage section to perform information processing.

10 Claims, 6 Drawing Sheets

(56) References Cited

U.S. PATENT DOCUMENTS

| | | | | |
|---|---|---|---|---|
| 5,794,054 A * | 8/1998 | Le | ................. | G06F 9/4401 |
| | | | | 710/240 |
| 5,819,087 A * | 10/1998 | Le | ................. | G06F 9/4401 |
| | | | | 713/2 |
| 6,154,838 A * | 11/2000 | Le | ................. | G06F 9/4401 |
| | | | | 710/10 |
| 6,662,269 B1 * | 12/2003 | Iida | ................. | G06F 3/0605 |
| | | | | 711/103 |
| 8,799,429 B1 * | 8/2014 | Chatterjee | ............ | G06F 9/4416 |
| | | | | 709/220 |
| 8,949,205 B2 * | 2/2015 | Tanaka | .............. | G06F 8/65 |
| | | | | 707/695 |
| 2002/0108053 A1 * | 8/2002 | Kashiwada | ........... | G06F 21/552 |
| | | | | 713/193 |
| 2004/0107309 A1 * | 6/2004 | Iida | ................. | G06F 3/0605 |
| | | | | 711/103 |
| 2004/0215908 A1 | 10/2004 | Zimmer et al. | | |
| 2007/0025694 A1 * | 2/2007 | Takashima | ............ | H04N 5/913 |
| | | | | 386/248 |
| 2007/0106890 A1 * | 5/2007 | Kwon | ................. | G06F 21/572 |
| | | | | 713/1 |
| 2007/0168652 A1 * | 7/2007 | Mylly | ................. | G06F 9/4401 |
| | | | | 713/2 |
| 2007/0208883 A1 * | 9/2007 | Bircher | ................. | G06F 9/4411 |
| | | | | 710/8 |
| 2007/0208885 A1 * | 9/2007 | Otsuka | ................. | G06F 12/1483 |
| | | | | 710/22 |
| 2008/0059659 A1 * | 3/2008 | Moritani | ................. | G06F 21/78 |
| | | | | 710/8 |
| 2008/0082811 A1 * | 4/2008 | Davis | ................. | G06F 9/45533 |
| | | | | 713/2 |
| 2008/0276011 A1 * | 11/2008 | Bircher | ................. | G06F 12/023 |
| | | | | 710/8 |
| 2009/0094603 A1 * | 4/2009 | Hiltgen | ................. | G06F 9/4406 |
| | | | | 718/1 |
| 2010/0005226 A1 * | 1/2010 | Maeda | ................. | G06F 3/0664 |
| | | | | 711/103 |
| 2011/0078760 A1 * | 3/2011 | De Perthuis | ........ | G06F 21/6218 |
| | | | | 726/1 |
| 2012/0159105 A1 * | 6/2012 | von Behren | ...... | H04W 12/0023 |
| | | | | 711/164 |
| 2012/0159195 A1 * | 6/2012 | von Behren | ....... | G06Q 20/3563 |
| | | | | 713/193 |
| 2013/0013906 A1 * | 1/2013 | Brown | ................. | G06F 21/575 |
| | | | | 713/2 |
| 2013/0086372 A1 * | 4/2013 | Kojo | ................. | G06F 9/4401 |
| | | | | 713/2 |
| 2013/0111207 A1 * | 5/2013 | von Behren | .......... | H04L 9/0897 |
| | | | | 713/164 |
| 2013/0191692 A1 * | 7/2013 | Garlick | ............... | G06F 11/0793 |
| | | | | 714/43 |
| 2013/0204929 A1 * | 8/2013 | Yoshida | ............ | H04L 29/06047 |
| | | | | 709/203 |
| 2013/0305057 A1 * | 11/2013 | Greco | ................. | G06F 21/62 |
| | | | | 713/189 |
| 2014/0029369 A1 * | 1/2014 | Yamazaki | .............. | G11C 16/10 |
| | | | | 365/230.03 |
| 2014/0057597 A1 * | 2/2014 | Velusamy | ............. | H04W 12/08 |
| | | | | 455/411 |
| 2014/0122902 A1 * | 5/2014 | Isozaki | ............... | G06F 12/1433 |
| | | | | 713/193 |
| 2015/0113258 A1 * | 4/2015 | Grieco | ................. | G06F 21/572 |
| | | | | 713/2 |
| 2015/0149757 A1 * | 5/2015 | Brown | ................. | G06F 21/575 |
| | | | | 713/2 |
| 2017/0024221 A1 * | 1/2017 | He | .......................... | G06F 8/654 |
| 2018/0260569 A1 * | 9/2018 | Sutton | ................. | G06F 21/575 |

FOREIGN PATENT DOCUMENTS

| | | |
|---|---|---|
| JP | 2001-283594 A | 10/2001 |
| JP | 2002-149493 A | 5/2002 |
| JP | 2009-015651 A | 1/2009 |
| JP | 2009-111650 A | 5/2009 |

OTHER PUBLICATIONS

Schoinas—"Fine-grain Access Control for Distributed Shared Memory," ACM, 1994, pp. 297-306 (Year: 1994).*

* cited by examiner

[FIG. 1]
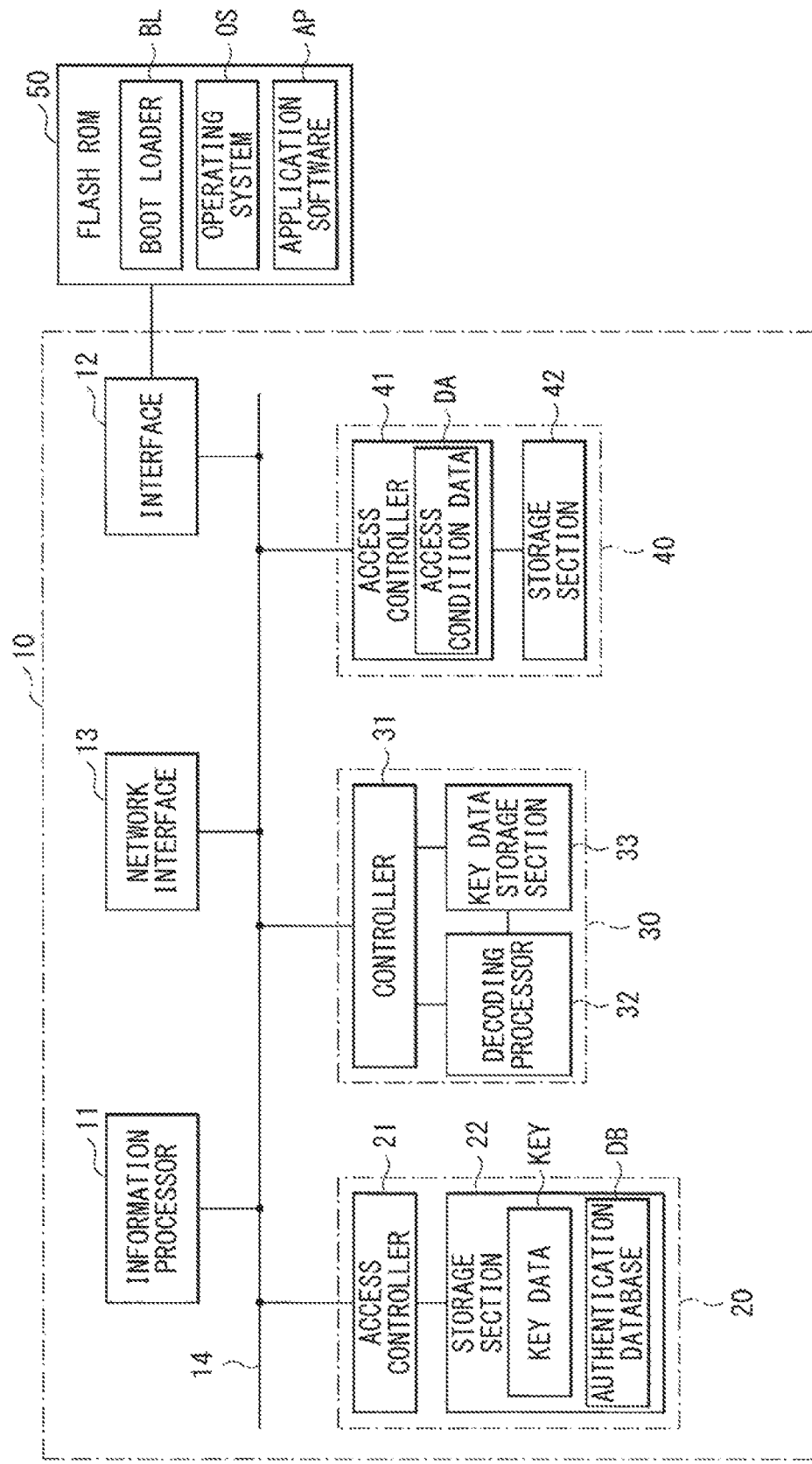

[ FIG. 2 ]
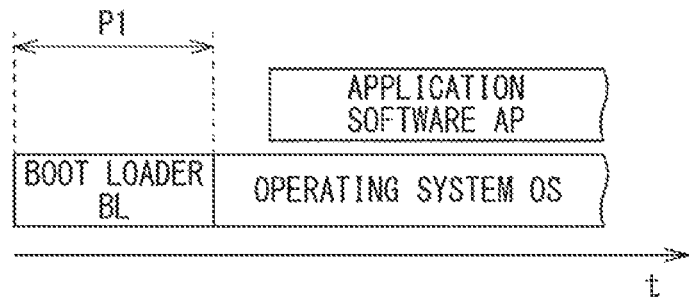
[ FIG. 3 ]
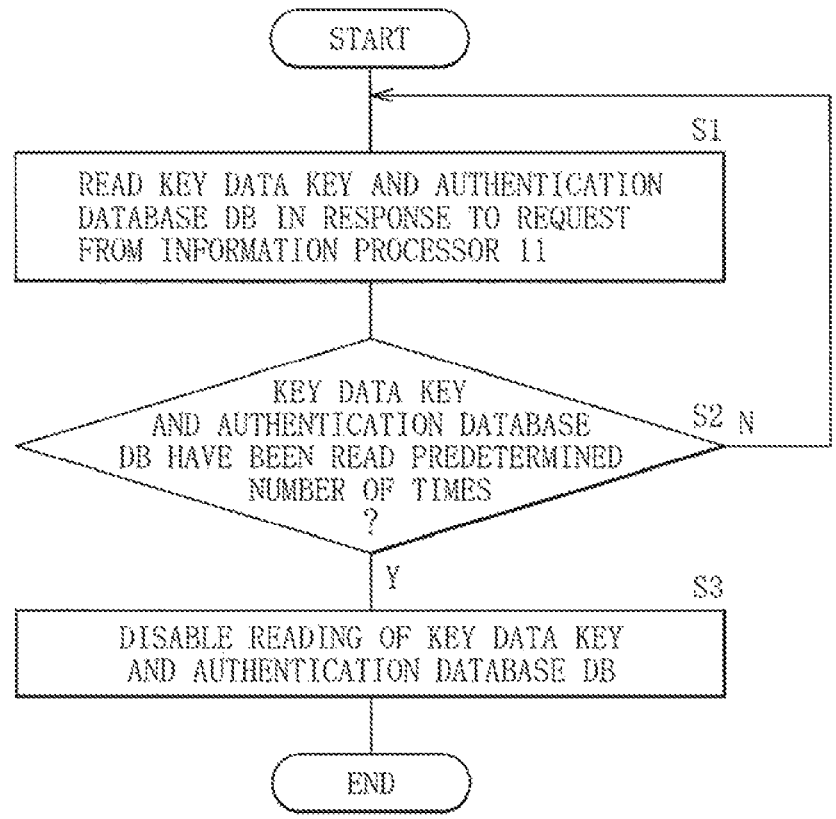

[ FIG. 4 ]
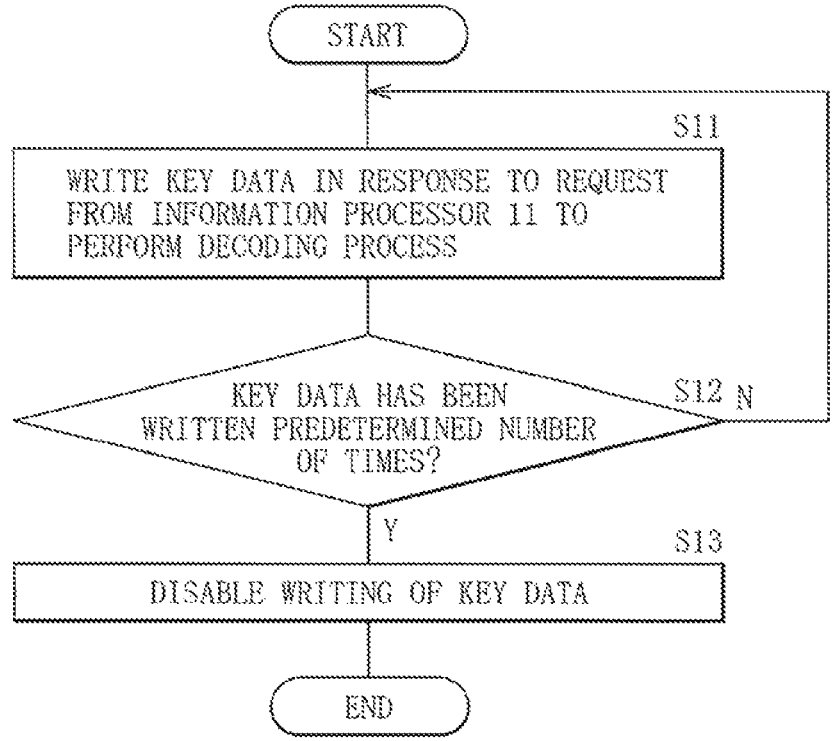
[ FIG. 5 ]
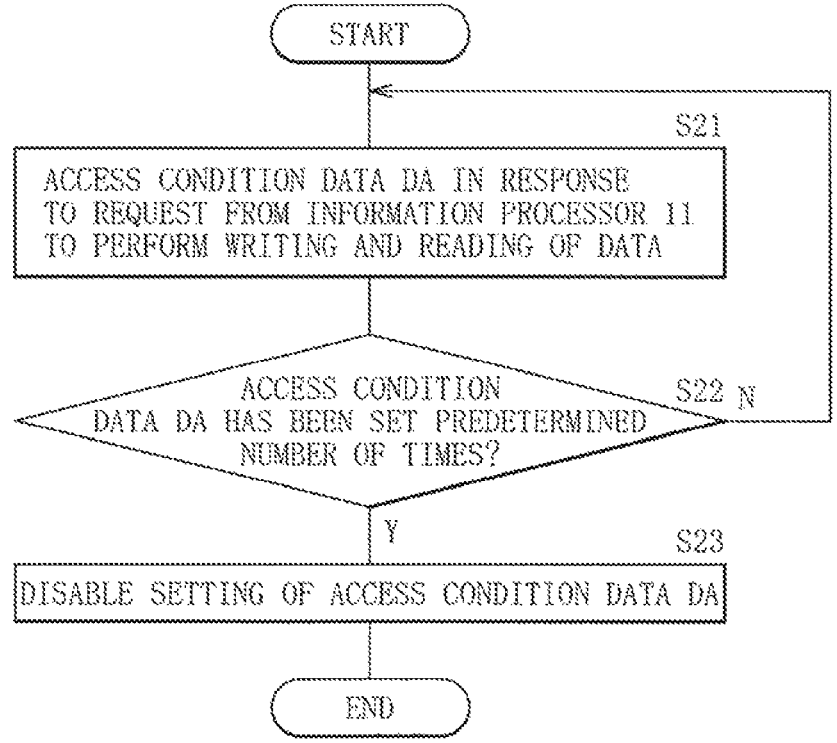

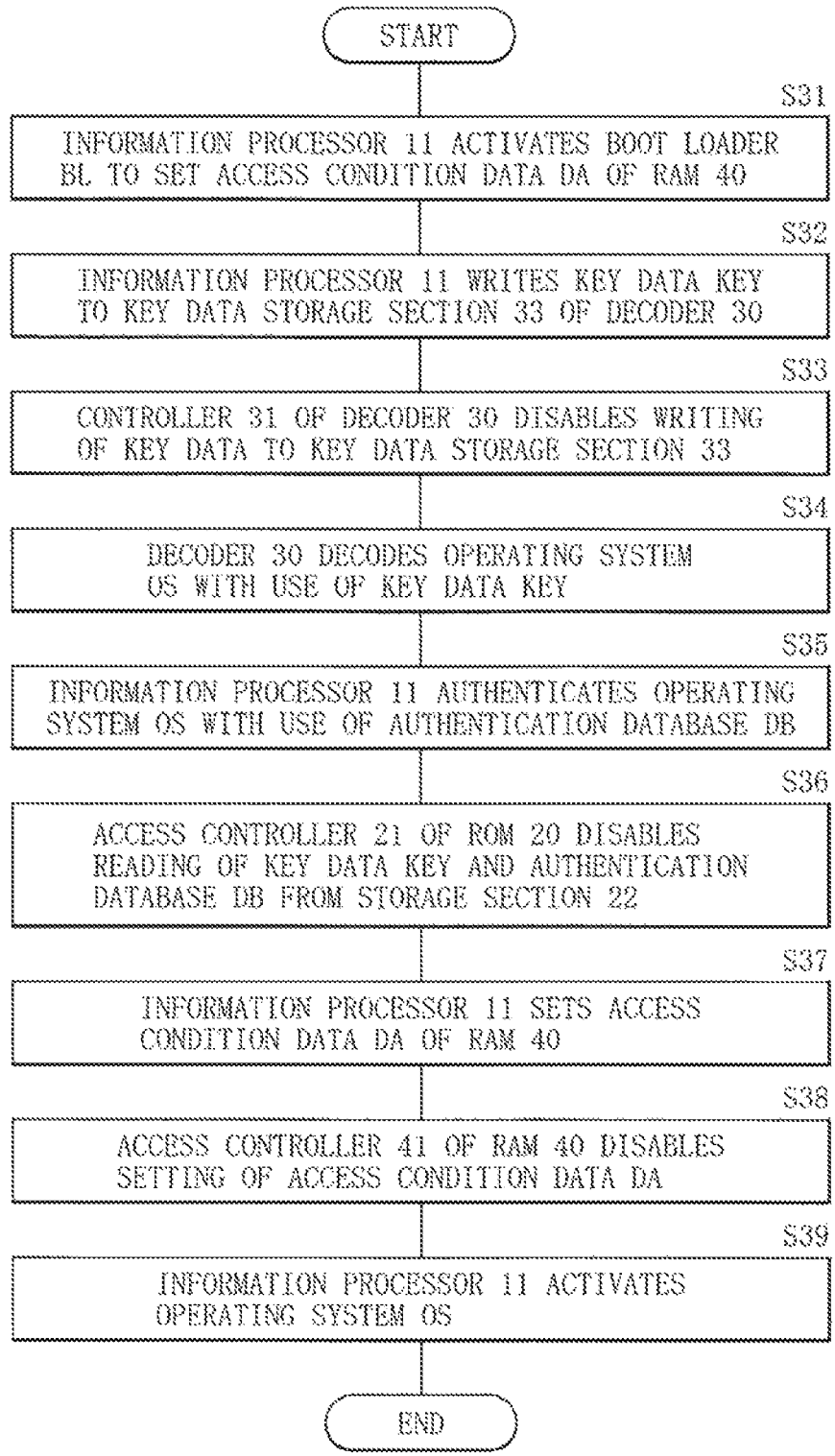
[ FIG. 6 ]

[FIG. 7]
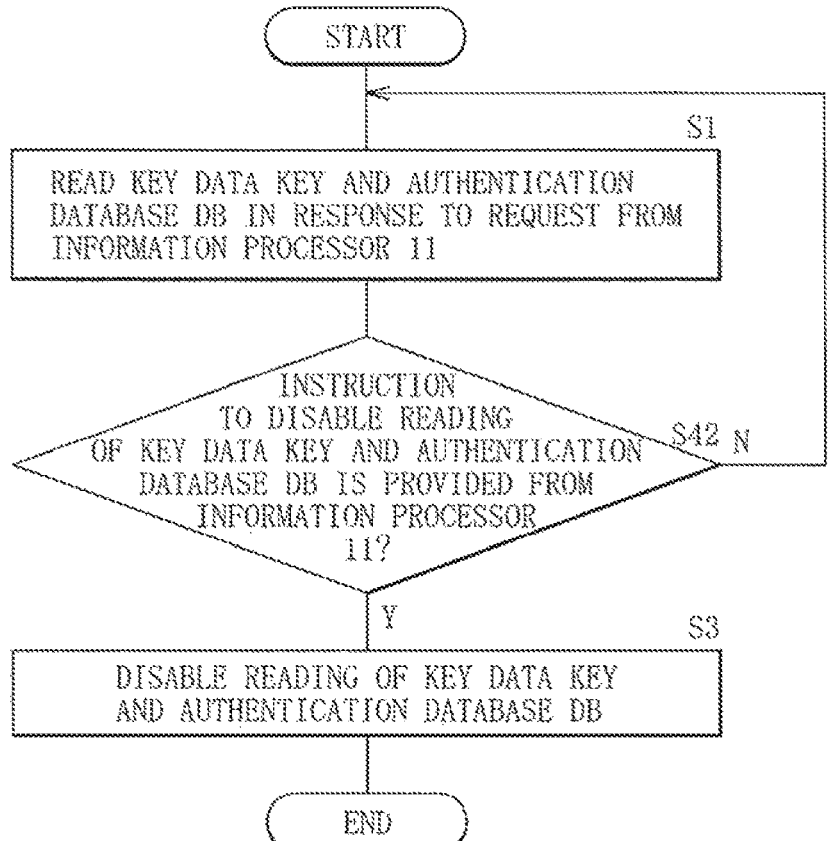
[FIG. 8]
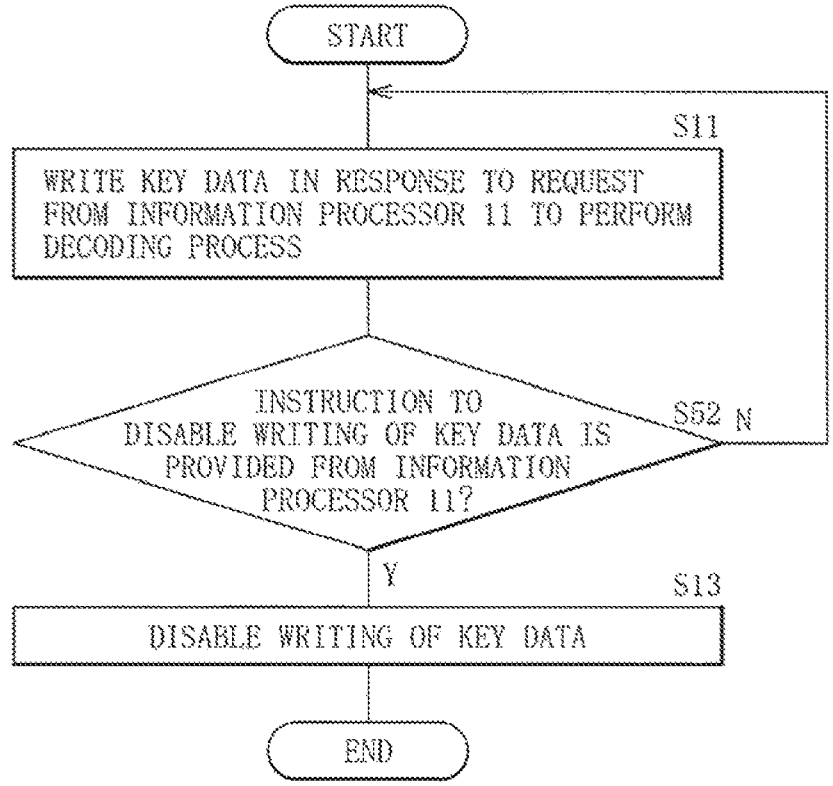

[ FIG. 9 ]
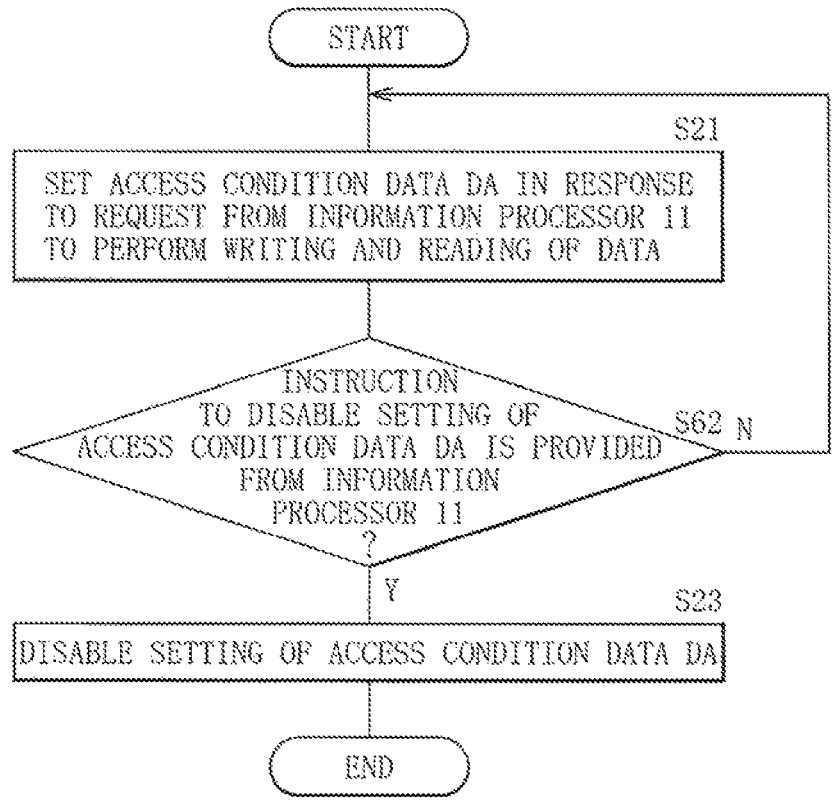
[ FIG. 10 ]
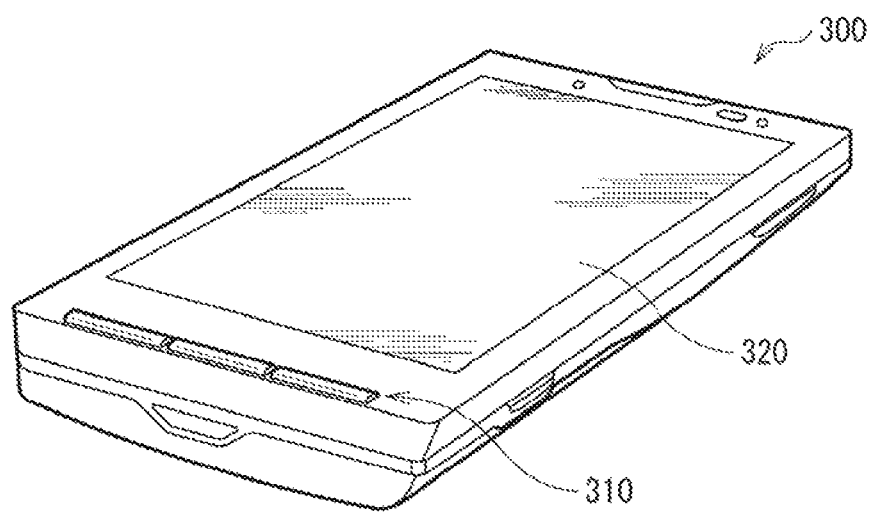

INFORMATION PROCESSING DEVICE, INFORMATION PROCESSING METHOD, AND ELECTRONIC APPARATUS

CROSS REFERENCE TO RELATED APPLICATIONS

This application is a U.S. National Phase of International Patent Application No. PCT/JP2015/062936 filed on Apr. 30, 2015, which claims priority benefit of Japanese Patent Application No. JP 2014-102329 filed in the Japan Patent Office on May 16, 2014. Each of the above-referenced applications is hereby incorporated herein by reference in its entirety.

TECHNICAL FIELD

The present disclosure relates to an information processing device that processes information including secret information, an information processing method, and an electronic apparatus including such an information processing device.

BACKGROUND ART

Electronic apparatuses often store secret information such as identification information specific to the apparatuses and key data. The electronic apparatuses each perform various kinds of processing with use of the secret information. In such electronic apparatuses, it is desirable to protect the secret information and enhance security.

There have been proposed various technologies of a method of enhancing security. For example, Patent Literature 1 discloses an encoder that is configured to prevent an encryption key from being outputted into a data bus, thereby improving security. Moreover, for example, Patent Literature 2 discloses a storage device that prevents unauthorized rewriting and erasure of information in a memory cell. Further, for example, Patent Literature 3 discloses an EEPROM (Electrically Erasable Programmable Read-Only Memory) that is configured to restrict data writing by hardware, thereby improving security. Furthermore, for example, Patent Literature 4 discloses a PROM (Programmable Read-Only Memory) that restricts writing to the PROM by a jumper, thereby improving security.

CITATION LIST

Patent Literature

Patent Literature 1: Japanese Unexamined Patent Application Publication No. 2002-149493
Patent Literature 2: Japanese Unexamined Patent Application Publication No. 2001-283594
Patent Literature 3: Japanese Unexamined Patent Application Publication No. H5-266681
Patent Literature 4: Japanese Unexamined Patent Application Publication No. H5-250267

SUMMARY

As described above, in the electronic apparatuses, high security is often desired, and further improvement of security is expected.

It is therefore desirable to provide an information processing device, an information processing method, and an electronic apparatus each of which allows for enhancement of security.

An information processing device according to an embodiment of the present disclosure includes a first storage section, an operation section, a second storage section, and an information processor. The first storage section is for reading only, and stores first data beforehand, and restricts reading of the first data after a first event. The operation section performs one or both of encoding and decoding with use of key data, and restricts, after a second event, change of the key data to be used. The second storage section is readable and writeable, and includes a plurality of storage regions for each of which access conditions are set. The second storage section restricts change of the access conditions after a third event. The information processor controls the first storage section, the operation section, and the second storage section to perform information processing.

An information processing method according to an embodiment of the present disclosure includes: restricting reading of first data by a first storage section for reading only after a first event; restricting, by an operation section after a second event, change of key data to be used, the operation section that performs one or both of encoding and decoding with use of the key data; and restricting change of access conditions by a second storage section after a third event, the second storage section being readable and writable, and the access conditions being set for each of a plurality of storage regions.

An electronic apparatus according to an embodiment of the present disclosure includes the foregoing information processing device, and may correspond to, for example, but not limited to, a smartphone, an electronic book, a PDA (Personal Digital Assistant), a HDD (Hard Disk Drive) player, a HDD recorder, players and recorders of various kinds of disks, a content delivery system, and a game machine.

In the information processing device, the information processing method, and the electronic apparatus according to the embodiments of the present disclosure, the first storage section stores the first data beforehand, the operation section performs one or both of encoding and decoding with use of the key data, and reading and writing of data are performed on the second storage section. At this occasion, in the first storage section, reading of the first data is restricted after the first event, and in the operation section, change of the key data to be used is restricted after the second event. Further, in the second storage section, change of the access conditions is restricted.

According to the information processing device, the information processing method, and the electronic apparatus of the embodiments of the present disclosure, in the first storage section, reading of the first data is restricted after the first event; in the operation section, change of the key data to be used is restricted after the second event; and in the second storage section, change of the access conditions is restricted. This makes it possible to enhance security. Note that effects described here are non-limiting. Effects achieved by the technology may be one or more of effects described in the present disclosure.

BRIEF DESCRIPTION OF DRAWINGS

FIG. 1 is a block diagram illustrating a configuration example of an information processing device according to an embodiment of the present disclosure.

FIG. 2 is a timing chart illustrating an operation example of the information processing device illustrated in FIG. 1.

FIG. 3 is a flow chart illustrating an operation example of a ROM illustrated in FIG. 1.

FIG. 4 is a flow chart illustrating an operation example of a decoder illustrated in FIG. 1.

FIG. 5 is a flow chart illustrating an operation example of a RAM illustrated in FIG. 1.

FIG. 6 is a flow chart illustrating an operation example of the information processing device illustrated in FIG. 1.

FIG. 7 is a flow chart illustrating an operation example of a ROM according to a modification example.

FIG. 8 is a flow chart illustrating an operation example of a decoder according to a modification example.

FIG. 9 is a flow chart illustrating an operation example of a RAM according to a modification example.

FIG. 10 is a perspective view of an appearance configuration of a smartphone to which the information processing device according to the embodiment is applied.

EMBODIMENTS FOR CARRYING OUT THE INVENTION

In the following, some embodiments of the present disclosure are described in detail with reference to the drawings. It is to be noted that description is given in the following order.
1. Embodiment
2. Application Examples

1. EMBODIMENT

CONFIGURATION EXAMPLE

FIG. 1 illustrates a configuration example of an information processing device according to an embodiment. It is to be noted that an information processing method and an electronic apparatus according to embodiments of the present disclosure may be embodied by the present embodiment, and description thereof is therefore given together. The information processing device 1 includes a flash ROM (Read-Only Memory) 50 and an information processing chip 10.

The flash ROM 50 stores a program that is executed by the information processing device 1. More specifically, the flash ROM 50 stores a boot loader BL, an operating system OS, and application software AP. The boot loader BL is a program that is first executed after the information processing device 1 is powered up, and activates the operating system OS after creating an execution environment of the operating system OS. The operating system OS is so-called basic software, and controls operations of respective blocks of the information processing device 1. In this example, the operating system OS is encoded and stored in the flash ROM 50. In other words, in this example, the operating system OS is encoded to reduce a risk of changing data of the operating system OS by a malicious third party. The application software AP operates together with the operating system OS to attain a specific function.

FIG. 2 schematically illustrates an operation example of the information processing device 1. After the information processing device 1 is powered up, first, the information processing device 1 reads the boot loader BL from the flash ROM 50, and executes the boot loader BL in a boot period P1. Subsequently, the information processing device 1 reads the encoded operating system OS from the flash ROM 50, and decodes the operating system OS, and thereafter activates the operating system OS. Thereafter, the information processing device 1 reads the application software AP from the flash ROM 50 in response to an instruction from a user, and activates the application software AP.

The information processing chip 10 includes an information processor 11, a ROM 20, a decoder 30, a RAM (Random Access Memory) 40, an interface 12, and a network interface 13. The information processing chip 10 may be, but not limited to, one chip configured of these blocks. It is to be noted that the information processing ship 10 is not limited thereto. Alternatively, for example, chips each configured of corresponding one of the blocks may be disposed on a substrate.

The information processor 11 is a so-called processor, and executes a program (such as the boot loader BL, the operating system OS, and the application software AP) to process information. The information processor 11 is coupled to a bus 14, and makes it possible to control other blocks through the bus 14.

The ROM 20 is a read-only storage device. The ROM 20 is coupled to the bus 14, and is controlled by the information processor 11 through the bus 14 to output data that is beforehand stored therein. The ROM 20 includes a storage section 22 and an access controller 21.

The storage section 22 stores data. In this example, the storage section 22 stores key data KEY and authentication database DB beforehand. The key data KEY and the authentication database DB are read when the information processor 11 executes the boot loader BL. The key data KEY is used to decode the encoded operating system OS stored in the flash ROM 50. The authentication database DB is used to authenticate whether the operating system OS is authorized. The key data KEY and the authentication database DB should be concealed to improve security.

The access controller 21 controls access to the key data KEY and the authentication database DB that are stored in the storage section 22. More specifically, in this example, after the information processor 11 activates the boot loader BL, and reads the key data KEY and the authentication database DB a predetermined number of times, the access controller 21 disables further reading. For example, in a case in which a total data amount of the key data KEY and the authentication database DB is 8 kilobits and a read access unit of the ROM 20 is 32 bits, the access controller 21 sets the number of allowable times of reading to 256 (=8 k/32). Accordingly, the information processor 11 is not allowed to read the key data KEY and the authentication database DB from the storage section 22 after the key data KEY and the authentication database DB are read the predetermined number of times. In other words, the information processing device 1 is not allowed to read the key data KEY and the authentication database DB from the storage section 22 after the boot period P1 is completed.

The decoder 30 decodes encoded data. The decoder 30 is coupled to the bus 14, and is controlled by the information processor 11 through the bus 14 to output decoded data. The decoder 30 includes a decoding processor 32, a key data storage section 33, and a controller 31.

The decoding processor 32 performs a decoding process. More specifically, the decoding processor 32 may decode, for example, the encoded operating system OS with use of the key data KEY, as described later. It is to be noted that the decoding processor 32 decodes not only the operating system OS but also other various encoded programs and data with use of various key data.

The key data storage section 33 may be configured using, for example, a RAM (Random Access Memory) or a flip-flop, and stores key data that is to be used by the decoding processor 32 in a decoding process. The key data is written to the key data storage section 33 when the information processor 11 executes the boot loader BL.

The controller 31 controls the decoding processor 32 and the key data storage section 33. At this occasion, the controller 31 controls access to the key data storage section 33. More specifically, in this example, after the information processor 11 activates the boot loader BL, and writes the key data to the key data storage section 33 a predetermined number of times, the controller 31 disables further writing. For example, in a case in which a data amount of the key data is 128 bits and a write access unit to the key data storage section 33 is 32 bits, the controller 31 sets the number of allowable times of writing to the key data storage section 33 to 4 (=128/32). Accordingly, the information processor 11 is not allowed to write the key data to the key data storage section 33 after the key data is written to the key data storage section 33 the predetermined number of times. In other words, the information processing device 1 is not allowed to change the key data in the key data storage section 33 after the boot period P1 is completed.

The RAM 40 is a readable and writable storage device. The RAM 40 is coupled to the bus 14, and is controlled by the information processor 11 through the bus 14 to store data. In other words, the RAM 40 functions as a so-called working memory of the information processor 11. The RAM 40 includes a storage section 42 and an access controller 41.

The storage section 42 stores data. The data stored in the storage section 42 includes data that should be concealed. The storage section 42 may be partitioned into, for example, a plurality of storage regions, and access conditions may be set for each of the storage regions on the basis of access condition data DA (to be described later).

The access controller 41 controls access to the storage section 42. The access controller 41 has the access condition data DA. The access condition data DA may include, for example, access conditions such as writing-reading accessibility by the boot loader BL and writing-reading accessibility by the operating system OS. The access condition data DA is set when the information processor 11 executes the boot loader BL. This may make it possible for the information processor 11 to set, for example, a storage region that is accessible when the boot loader BL is executed and a storage region that is accessible when the operating system OS is executed.

At this occasion, in this example, after the information processor 11 activates the boot loader BL, and sets the access condition data DA a predetermined number of times, the access controller 41 disables further setting of the access condition data DA. Accordingly, the information processor 11 is not allowed to set the access condition data DA after the access condition data DA is set the predetermined number of times. In other words, the information processing device 1 is not allowed to change the access condition data DA after the boot period P1 is completed.

The interface 12 is an interface that exchanges data with a device external to the information processing chip 10. The interface 12 is coupled to the bus 14, and, for example, the information processor 11 may read a program (such as the boot loader BL, the operating system OS, and the application software AP) from the flash ROM 50 through the bus 14 and the interface 12, and may control some other external device (not illustrated) through the bus 14 and the interface 12.

The network interface 13 may be an interface that exchanges data with, for example, servers (not illustrated) on a network. The network interface 13 is coupled to the bus 14, and, for example, the information processor 11 may perform communication with, for example, the servers through the bus 14 and the network interface 13 to allow for downloading of, for example, various data.

Here, the ROM 20 corresponds to a specific example of a "first storage section" in the present disclosure, and the RAM 40 corresponds to a specific example of a "second storage section" in the present disclosure. The decoder 30 corresponds to a specific example of an "operation section" in the present disclosure.

[Operation and Workings]

In the following, description is given of an operation and workings of the information processing device 1 according to the present embodiment.

(Summary of Entire Operation)

First, description is given of a summary of an entire operation of the information processing device 1 with reference to FIG. 1. The flash ROM 50 stores a program (such as the boot loader BL, the operating system OS, and the application software AP). The information processor 11 executes a program to process information. The storage section 22 of the ROM 20 stores the key data KEY and the authentication database DB. The access controller 21 of the ROM 20 controls access to the key data KEY and the authentication database DB in the storage section 22. The decoding processor 32 of the decoder 30 performs a decoding process. The key data storage section 33 of the decoder 30 stores key data that is to be used by the decoding processor 32 in the decoding process. The controller 31 of the decoder 30 controls the decoding processor 32 and the key data storage section 33. The storage section 42 of the RAM 40 stores data. The access controller 41 of the RAM 40 controls access to the storage section 42 with use of the access condition data DA. The interface 12 exchanges data with a device external to the information processing chip 10. The network interface 13 exchanges data with, for example, servers on a network.

(Operations of ROM 20, Decoder 30, and RAM 40)

Operations of the ROM 20, the decoder 30, and the RAM 40 are restricted after a predetermined event occurs in the boot period P1. Details are given below.

FIG. 3 illustrates a flow chart of an operation of the access controller 21 of the ROM 20. After the key data KEY and the authentication database DB are read a predetermined number of times, the access controller 21 of the ROM 20 disables further reading. This operation is described in detail below.

First, the access controller 21 reads the key data KEY and the authentication database DB from the storage section 22 in response to a request from the information processor 11 (step S1).

Subsequently, the access controller 21 determines whether the key data KEY and the authentication database DB have been read the predetermined number of times (step S2). In a case in which the key data KEY and the authentication database DB have not been read the predetermined number of times ("N" in the step S2), the operation of the access controller 21 returns to the step S1.

In the step S2, in a case in which the key data KEY and the authentication database DB have been read the predetermined number of times ("Y" in the step S2), the access controller 21 disables reading of the key data KEY and the authentication database DB from the storage section 20 (step S3).

Thus, this flow is completed.

FIG. 4 illustrates a flow chart of an operation of the controller 31 of the decoder 30. After key data is written to the key data storage section 33 a predetermined number of times, the controller 31 of the decoder 30 disables further writing. This operation is described in detail below.

First, the controller 31 writes key data to the key data storage section 33 in response to a request from the information processor 11 to cause the decoding processor 32 to perform a decoding process with use of the key data (step S11).

Subsequently, the controller 31 determines whether the key data has been written the predetermined number of times (step S12). In a case in which the key data has not been written the predetermined number of times ("N" in the step S12), the operation of the controller 31 returns to the step S11.

In the step S12, in a case in which the key data has been written the predetermined number of times ("Y" in the step S12), the controller 31 disables writing of the key data (step S13).

Thus, this flow is completed.

FIG. 5 illustrates a flow chart of an operation of the access controller 41 of the RAM 40. After the access controller 41 of the RAM 40 sets the access condition data DA a predetermined number of times, the access controller 41 disables further setting of the access condition data DA. This operation is described in detail below.

First, the access controller 41 sets the access condition data DA in response to a request from the information processor 11 to perform writing of data to the storage section 42 and reading of data from the storage section 42 with use of the access condition data DA (step S21).

Subsequently, the access controller 41 determines whether the access condition data DA has been set the predetermined number of times (step S22). In a case in which the access condition data DA has not been set the predetermined number of times ("N" in the step S22), the operation by the access controller 41 is returned to the step S21.

In the step S22, in a case in which the access condition data DA has been set the predetermined number of times ("Y" in the step S22), the access controller 41 disables setting of the access condition data DA (step S23).

Thus, this flow is completed.

(Operation of Information Processing Device 1)

FIG. 6 illustrates a flow chart of an operation example of the information processing device 1. The information processing device 1 first activates the boot loader BL, and then decodes the encoded operating system OS, and authenticates the decoded operating system OS. Thereafter, the information processing device 1 activates the operating system OS. This operation is described in detail below.

First, the information processor 11 activates the boot loader BL to set the access condition data DA of the RAM 40 (step S31). More specifically, first, the information processor 11 reads data of the boot loader BL from the flash ROM 50, and activates the boot loader BL. Subsequently, the information processor 11 sets the access condition data DA of the RAM 40 to set a storage region that is accessible when the boot loader BL is executed. Thereafter, the information processor 11 performs information processing with use of the set storage region as a working memory.

Subsequently, the information processor 11 writes the key data KEY to the key data storage section 33 of the decoder 30 (step S32). More specifically, the information processor 11 reads the key data KEY from the ROM 20, and writes the key data KEY to the key data storage section 33 of the decoder 30.

Subsequently, the controller 31 of the decoder 30 disables writing of the key data to the key data storage section 33 (step S33). In other words, in the step S32, the information processor 11 has written the key data to the key data storage section 33 the predetermined number of times. Hence, the controller 31 disables further writing of the key data.

Subsequently, the decoder 30 decodes the operating system OS with use of the key data KEY (step S34). More specifically, first, the information processor 11 reads data of the encoded operating system OS from the flash ROM 50. Thereafter, the decoder 30 decodes the operating system OS with use of the key data KEY stored in the key data storage section 33.

Subsequently, the information processor 11 authenticates the operating system OS with use of the authentication database DB (step S35). More specifically, the information processor 11 reads the authentication database DB from the ROM 20, and performs an authentication process on the operating system OS decoded in the step S34.

Subsequently, the access controller 21 of the ROM 20 disables reading of the key data KEY and the authentication database DB from the storage section 22 (step S36). In other words, in the steps S32 and S35, the information processor 11 has read the key data KEY and the authentication database DB the predetermined number of times. Hence, the access controller 21 disables further reading of the key data KEY and the authentication database DB.

Subsequently, the information processor 11 sets the access condition data DA of the RAM 40 (step S37). More specifically, the information processor 11 sets the access condition data DA to set a storage region that is accessible when the operating system OS is next executed. Thereafter, the information processor 11 performs information processing with use of the set storage region as a working memory.

Subsequently, the access controller 41 of the RAM 40 disables setting of the access condition data DA (step S38). In other words, in the steps S31 and S37, the information processor 11 has set the access condition data DA the predetermined number of times. Hence, the access controller 41 disables further setting of the access condition data DA.

Subsequently, the information processor 11 activates the operating system OS (step S39). More specifically, the information processor 11 activates the operating system OS on the basis of decoded and authenticated data of the operating system OS.

As described above, in the information processing device 1, the ROM 20, the decoder 30, and the RAM 40 restrict their operations after a predetermined event occurs in the boot period P1. More specifically, after the key data KEY and the authentication database DB are read the predetermined number of times, the access controller 21 of the ROM 20 disables further reading. After the key data is written to the key data storage section 33 the predetermined number of times, the controller 31 of the decoder 30 disables further writing. After the access condition data DA is set the predetermined number of times, the access controller 41 of the RAM 40 disables further setting of access condition data DA. Moreover, in particular, in the information processing device 1, the information processor 11 performs, only in the boot period P1, reading of the key data KEY and the authentication database DB from the ROM 20, writing of the key data in the decoder 30, and setting of the access condition data DA in the RAM 40. Accordingly, in the information processing device 1, the operating system OS does not use secret information (such as the key data KEY and the authentication database DB). This makes it possible to reduce a risk of passing the secret information to a third party and to enhance security, even if the operating system OS has a security hole.

In particular, operating systems tend to grow in total code quantity every year. Accordingly, in terms of a workload and work hours, it has become difficult to check that the operating systems do not have a security hole. In the information processing device 1, the secret information is covered by not the operating system OS but the boot loader BL. A total code quantity of a typical boot loader is extremely smaller than a total code quantity of a typical operating system, and it is therefore easy to check a security hole in the boot loader. Accordingly, it is possible for the information processing device 1 to achieve a system having higher security.

[Effects]

As described above, in the present embodiment, the ROM, the decoder, and the RAM restrict their operations after the predetermined event occurs, which makes it possible to enhance security.

MODIFICATION EXAMPLE 1

In the foregoing embodiment, the ROM 20 disables further reading after the data KEY and the authentication database DB are read the predetermined number of times; however, the embodiment is not limited thereto. Alternatively, for example, the information processor 11 may instruct the ROM 20 to disable reading of the key data KEY and the authentication database DB, and the access controller 21 of the ROM 20 may disable further reading of the key data KEY and the authentication database DB on the basis of such an instruction, as illustrated in FIG. 7.

MODIFICATION EXAMPLE 2

In the foregoing embodiment, the decoder 30 disables further writing after the data storage section 33 writes the key data the predetermined number of times; however, the embodiment is not limited thereto. Alternatively, for example, the information processor 11 may instruct the decoder 30 to disable writing of the key data, and the controller 31 of the decoder 30 may disable further writing of the key data on the basis of such an instruction, as illustrated in FIG. 8.

MODIFICATION EXAMPLE 3

In the foregoing embodiment, the RAM 40 disables further setting of the access condition data DA after the access condition data DA is set the predetermined number of times; however, the embodiment is not limited thereto. Alternatively, for example, the information processor 11 may instruct the RAM 40 to disable setting of the access condition data DA, and the access controller 41 of the RAM 40 may disable further setting of the access condition data DA on the basis of such an instruction, as illustrated in FIG. 9.

MODIFICATION EXAMPLE 4

In the foregoing embodiment, the ROM 20 stores data (the key data KEY and the authentication database DB) that is to be used for activation of the operating system OS; however, the embodiment is not limited thereto, and the ROM 20 may store various data. More specifically, the ROM 20 may store, for example, identification information specific to a device, key data of data that is to be exchanged through a network, and authentication information for connection with servers in a network.

MODIFICATION EXAMPLE 5

In the foregoing embodiment, the controller 31 of the decoder 30 disables writing after the key data is written to the key data storage section 33 once; however, the embodiment is not limited thereto. The controller 31 may disable writing after the key data is written a plurality of times. In this case, for example, the storage section 22 may store a plurality of pieces of key data, and may change key data of the key data storage section 33, thereby allowing for decoding of a plurality of programs and a plurality of pieces of data.

Likewise, in the foregoing embodiment, the access controller 21 of the ROM 20 disables reading after the key data KEY and the authentication database DB are read once; however, the embodiment is not limited thereto. The access controller 21 may disable reading after the key data KEY and the authentication database DB are read a plurality of times. Moreover, in the foregoing embodiment, the access controller 41 of the RAM 40 disables setting after the access condition data DA is set twice; however, the embodiment is not limited thereto. The access controller 41 may disable setting after the access condition data DA is set once or three or more times.

MODIFICATION EXAMPLE 6

In the foregoing embodiment, the decoder 30 that performs a decoding process is provided; however, the embodiment is not limited thereto. Alternatively, an encoder-decoder that performs an encoding process and a decoding process may be provided.

OTHER MODIFICATION EXAMPLES

Moreover, two or more of these modification examples may be combined.

2. APPLICATION EXAMPLES

In the following, description is given of application examples of the information processing devices described in the foregoing embodiment and modification examples.

FIG. 10 illustrates an appearance of a smartphone to which any of the information processing devices of the foregoing embodiment and examples is applied. The smartphone may include, for example, a main body section 310 and a display section 320. Any of the foregoing information processing devices is mounted in the smartphone 300. It is to be noted that any of the foregoing information processing devices may be applied to a main processor that performs an operation of the entire smartphone 300, or a processor that operates in a particular use such as a GPU (Graphics Processing Unit).

The information processing devices of the foregoing embodiment and examples are applicable to not only such a smartphone, but also electronic apparatuses in every field that uses secret information, such as an electronic book, a PDA, a HDD player, a HDD recorder, players and recorders of various kinds of disks, a content delivery system, and a game machine.

Although the present technology is described referring the embodiment, the modification examples, and application examples to electronic apparatuses, the present technology is not limited thereto, and may be variously modified.

In the foregoing embodiment and examples, the flash ROM 50 is disposed, for example, but not limited to, outside the information processing chip 10. Alternatively, the flash ROM 50 may be integrated into, for example, the information processing ship 10.

Note that the effects described in the present specification are illustrative and non-limiting. Effects achieved by the present technology may be effects other than those described above.

It is to be noted that the present technology may have the following configurations.

(1) An information processing device including:
a first storage section for reading only that stores first data beforehand, and restricts reading of the first data after a first event;
an operation section that performs one or both of encoding and decoding with use of key data, and restricts, after a second event, change of the key data to be used;
a second storage section being readable and writeable and including a plurality of storage regions for each of which access conditions are set, the second storage section that restricts change of the access conditions after a third event; and
an information processor that controls the first storage section, the operation section, and the second storage section to perform information processing.

(2) The information processing device according to (1), wherein
the information processor activates an operating system after activating a boot loader, and
the first event, the second event, and the third event each occur in a period in which the information processor executes the boot loader.

(3) The information processing device according to (1) or (2), wherein the first event is that the information processor has read the first data a predetermined number of times.

(4) The information processing device according to (1) to (2), wherein the first event is an instruction from the information processor.

(5) The information processing device according to any one of (1) to (4), wherein the second event is that the information processor has written the key data a predetermined number of times.

(6) The information processing device according to any one of (1) to (4), wherein the second event is an instruction from the information processor.

(7) The information processing device according to any one of (1) to (6), wherein the third event is that the information processor has set the access conditions a predetermined number of times.

(8) The information processing device according to any one of (1) to (6), wherein the third event is an instruction from the information processor.

(9) The information processing device according to any one of (1) to (8), wherein the first data is secret data.

(10) The information processing device according to any one of (1) to (9), wherein the first data includes the key data.

(11) The information processing device according to any one of (1) to (10), wherein at least one of the storage regions stores secret data.

(12) An information processing method including:
restricting reading of first data by a first storage section for reading only after a first event;
restricting, by an operation section after a second event, change of key data to be used, the operation section that performs one or both of encoding and decoding with use of the key data; and
restricting change of access conditions by a second storage section after a third event, the second storage section being readable and writable, and the access conditions being set for each of a plurality of storage regions.

(13) An electronic apparatus provided with an information processing device and a device controlled by the information processing device, the information processing device including:
a first storage section for reading only that stores first data beforehand, and restricts reading of the first data after a first event;
an operation section that performs one or both of encoding and decoding with use of key data, and restricts, after a second event, change of the key data to be used;
a second storage section being readable and writeable and including a plurality of storage regions for each of which access conditions are set, the second storage section that restricts change of the access conditions after a third event; and
an information processor that controls the first storage section, the operation section, and the second storage section to perform information processing.

This application claims the priority on the basis of Japanese Patent Application No. 2014-102329 filed on May 16, 2014 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processing device, comprising:
a first memory configured to store first data;
a key data memory;
a second memory configured to store second data, wherein the second memory includes a plurality of storage regions;
an information processor configured to:
 execute a boot loader in a boot period;
 read the first data from the first memory in the boot period;
 write key data in the key data memory in the boot period;
 set access condition data for the second memory in the boot period;
 set access conditions for each of the plurality of storage regions based on the set access condition data; and
 control, after occurrence of a first event, the first memory to restrict the read of the first data, wherein the first event is that the information processor has read the first data a first number of times; and
a decoding processor configured to:
 decode operating system data with use of the key data; and
 restrict, after occurrence of a second event, change of the key data,
wherein
 the second event is that the information processor has written the key data a second number of times,
 the information processor is further configured to:
 read the second data from the second memory based on the set access condition data;
 control, after occurrence of a third event, the second memory to restrict change of the access conditions; and
 activate an operating system based on the decoded operating system data and the execution of the boot loader, and
 the third event is that the information processor has set the access conditions a third number of times.

2. The information processing device according to claim 1, wherein each of the first event, the second event, and the third event occurs in the boot period.

3. The information processing device according to claim 1, wherein the first event is an instruction from the information processor.

4. The information processing device according to claim 1, wherein the second event is an instruction from the information processor.

5. The information processing device according to claim 1, wherein the third event is an instruction from the information processor.

6. The information processing device according to claim 1, wherein the first data is secret data.

7. The information processing device according to claim 1, wherein the first data includes the key data.

8. The information processing device according to claim 1, wherein at least one storage region of the plurality of storage regions is configured to store secret data.

9. An information processing method, comprising:
in an information processing device that includes a first memory, a key data memory, a second memory, an information processor, and a decoding processor, wherein the second memory includes a plurality of storage regions:
storing first data in the first memory;
storing second data in the second memory;
executing, by the information processor, a boot loader in a boot period;
reading, by the information processor, the first data from the first memory in the boot period;
writing, by the information processor, key data in the key data memory in the boot period;
setting, by the information processor, access condition data for the second memory in the boot period;
setting, by the information processor, access conditions for each of the plurality of storage regions based on the set access condition data;
controlling, by the information processor, after occurrence of a first event, the first memory to restrict the reading of the first data,
wherein the first event is that the information processor has read the first data a first number of times;
executing, by the decoding processor, decoding of operating system data with use of the key data;
restricting, by the decoding processor, change of the key data after occurrence of a second event, wherein the second event is that the information processor has written the key data a second number of times;
reading, by the information processor, the second data from the second memory based on the set access condition data;
controlling, by the information processor, after occurrence of a third event, the second memory to restrict change of the access conditions, wherein the third event is that the information processor has set the access conditions a third number of times; and
activating, by the information processor, an operating system based on the decoded operating system data and the execution of the boot loader.

10. An electronic apparatus, comprising:
an information processing device; and
a device controlled by the information processing device, the information processing device comprising:
a first memory configured to store first data;
a key data memory;
a second memory configured to store second data, wherein the second memory includes a plurality of storage regions;
an information processor configured to:
execute a boot loader in a boot period;
read the first data from the first memory in the boot period;
write key data in the key data memory in the boot period;
set access condition data for the second memory in the boot period;
set access conditions for each of the plurality of storage regions based on the set access condition data; and
control, after occurrence of a first event, the first memory to restrict the read of the first data, wherein the first event is that the information processor has read the first data a first number of times; and
a decoding processor configured to:
decode operating system data with use of the key data; and
restrict, after occurrence of a second event, change of the key data,
wherein
the second event is that the information processor has written the key data a second number of times,
the information processor is further configured to:
read the second data from the second memory based on the set access condition data;
control, after occurrence of a third event, the second memory to restrict change of the access conditions; and
activate an operating system based on the decoded operating system data and the execution of the boot loader, and
the third event is that the information processor has set the access conditions a third number of times.

* * * * *